United States Patent Office 3,481,861
Patented Dec. 2, 1969

3,481,861
REGENERATION OF COKE-DEACTIVATED CATALYST CONTAINING A PLATINUM GROUP COMPONENT AND A SULFUR COMPONENT
John C. Hayes, Palatine, Ill., assignor to Universal Oil Products Company, Des Plaines, Ill., a corporation of Delaware
No Drawing. Continuation-in-part of application Ser. No. 570,701, Aug. 8, 1966. This application Jan. 16, 1968, Ser. No. 698,138
Int. Cl. C10g *35/08;* B01j *11/02*
U.S. Cl. 208—140          6 Claims

ABSTRACT OF THE DISCLOSURE

Method for regenerating a coke-deactivated hydrocarbon conversion catalyst containing platinum and sulfur. Key feature of method is avoidance (throughout the regeneration) of the simultaneous presence of sulfur and oxygen in the environment containing the catalyst. Method involves the steps of: (1) hydrogen treating the catalyst, prior to any contact with oxygen, to reduce its sulfur content to less than about 0.02 wt. percent; (2) burning the coke from the resulting substantially sulfur-free catalyst (3) reducing the platinum component of the catalyst with sulfur-free and water-free hydrogen; and, (4) reincorporating sulfur into the catalyst by treatment with $H_2$-$H_2S$ at 900–1100° F.

CROSS-REFERENCE TO RELATED APPLICATIONS

This application is a continuation-in-part of copending application Ser. No. 570,701, filed Aug. 8, 1966 which in turn is a continuation-in-part of my copending application Ser. No. 560,903, filed June 27, 1966 and both now abandoned.

DISCLOSURE

The subject of the present invention is a method for regenerating a coke-deactivated hydrocarbon conversion catalyst containing a platinum group component and sulfur. Heretofore it has been extremely difficult to regenerate this type of catalyst by any of the conventional techniques for burning coke from the catalyst. I have now found a method of regeneration for this type of catalyst which insures the recovery of substantially all of its initial hydrocarbon conversion capabilities. The concept of this method was facilitated by my recognition that the adverse effects, that have heretofore been commonly encountered, are primarily caused by the simultaneous presence of sulfur and oxygen at high temperatures and an agglomeration reaction involving the highly dispersed platinum crystallites contained in the catalyst. It has been established that the high dispersal of these crystallites is an essential condition for a highly active catalyst, and that this agglomeration reaction permanently destroys activity by converting the dispersed crystallites into much larger crystallites having much less available surface area. Accordingly, it is an essential feature of my regeneration method that sulfur and oxygen are never simultaneously allowed to contact the catalyst being regenerated. Furthermore, this critical restriction is enforced not only during the coke-burning step of the method but also during the subsequent reduction and sulfiding steps thereof in order to produce a regenerated catalyst of consistently high quality.

Catalytic composites containing at least one metal of the platinum group have attained extensive commercial utility and acceptance in industries such as the petrochemical industry, the pharmaceutical industry, the detergent industry, numerous areas of the petroleum industry, etc. These commercial industries utilize platinum metal-containing catalytic composites for the purpose of accelerating a myriad of reactions involving conversion of hydrocarbons including hydrogenation, dehydrocyclization, alkylation, hydrocracking, polymerization, isomerization, dehydrogenation, oxidation, etc. For example, a widely used petroleum process for upgrading the octane characteristic of gasoline boiling range stocks, commonly called reforming, typically used a platinum metal-containing catalytic composite in order to promote octane-upgrading reactions such as dehydrocyclization of paraffins, dehydrogenation of naphthenes, etc. Another example is the hydroisomerization of pentane and hexanes to highly branched isomers over platinum metal-containing catalysts. Yet another example is the conversion of benzene to high purity cyclohexane over a catalyst of this type.

Regardless of the industry and/or reaction involved it is essential for commercial acceptance that the particular catalyst utilized exhibit a prolonged capability for the performance of its intended function as well as high degree of activity. For a long period of time it had generally been accepted in the art that sulfur and sulfur-containing compounds were poisons for platinum metal-containing catalysts, and contact between these materials and the catalyst was to be avoided at all costs. In harmony with this philosophy, extensive treating facilities were constructed and are in present day use for the purpose of eliminating, among other things, these allegedly detrimental sulfur compounds from the hydrocarbon charge stocks used in the hydrocarbon conversion processes employing such a catalyst. Recently, however, a growing body of evidence is accumulating to the effect that sulfur and/or sulfur compounds are not as detrimental as originally suspected. And even more surprisingly in some cases they may actually be beneficial to the operation of such a process. A case in point is a low pressure reforming operation in which it has been recently discovered that the presence of controlled quantities of hydrogen sulfide can be utilized to effect a substantial reduction in the rate of deposition of carbonaceous deposits with corresponding increase in the stability of the process. Likewise, in hydrocracking processes employing this type of catalysts there is some evidence to support the hypothesis that sulfur is not harmful to a platinum metal catalyst used therein. Accordingly, in many of these processes sulfur is now being deliberately added or injected into the associated hydrocarbon conversion zone for a number of diverse reasons such as yield advantages, suppression of carbon formation, reaction control during start-up operations, promotion of desired reactions, etc. Irrespective of why the sulfur is present, or of what the precise effects of sulfur are, or of what reactions are involved in the process, it is clear that after extended periods of use the platinum metal-containing catalyst so employed, inevitably becomes deactivated, thereby losing the capability to function as desired.

This deactivation of platinum metal-containing catalytic composites used in sulfur service is seldom sudden and most often occurs through a decline in activity. In general, deactivation of a catalyst may result from any one of a combination of a number of adverse effects. These effects may in turn result from substances which are peculiar to the particular catalyst, or which result in a change in the physical state of the components of the catalyst, or which result in a loss of these components. Catalyst deactivation may also result from the deposition of impurities which typically cover the catalytically active sites thereby shielding them from the material being processed. Generally, the principal cause of deactivation in hydrocarbon conversion processes employing platinum metal catalyst, is the deposition of coke and other carbonaceous materials on the surface of the catalyst. Not unexpectedly, hydrocarbon conversion processes employing sulfur as an additional reagent, or additive, or reactant, deactivate in a similar fashion: namely, deposition of carbonaceous material. However, despite similar deactivation characteristics, the reactivation problems encountered when sulfur has been employed differ markedly from the conventional reactivation situation in that sulfur tends to accumulate both on the catalyst and in the plant hardware, both of which can be, as is well-known, substantial sources of sulfur during subsequent catalyst regeneration operation.

The concept of the present invention resulted from my investigation into the problems associated with regeneration of these coke-deactivated catalyst containing sulfur and a platinum metal. Heretofore oxygen treatment of these carbonized catalysts has not been successful in restoring the desired degree of activity. I have now found that the reason for this is that the oxidation treatment triggers a different type of deactivation mechanism which results in the agglomeration of the highly dispersed platinum metal crystallites and an apparently irreversible decline in activity. And I believe that this agglomeration deactivation reaction is triggered by this simultaneous presence of sulfur and oxygen at high temperatures in the environment containing the catalyst. Accordingly, I have found that it is first necessary to remove substantially all of the sulfur from the catalyst before burning any coke from the catalyst. Coupled with this step, I have found it is essential to perform subsequent reduction and sulfiding steps on this catalyst so that the simultaneous presence of sulfur and oxygen is also avoided in these steps.

It is, therefore, an object of the present invention to provide a method for regenerating a coke-deactivated catalyst containing a platinum group component and a sulfur component which substantially restores its initial activity. A corollary object is to provide a regenerating procedure which avoids deactivating these sulfur-containing catalysts via a platinum metal agglomeration reaction.

In one aspect the present invention relates ot a hydrocarbon conversion process wherein a hydrocarbon charge stock, a sulfur additive and hydrogen are simultaneously contacted at hydrocarbon conversion conditions with a catalyst containing a platinum group component and a sulfur component. As a result of this contacting, carbonaceous materials deposit on the catalyst and deactivate it. According to the present invention, this deactivated catalyst is regenerated by a method comprising the steps of: (a) stopping the contacting of the hydrocarbon charge stock with the catalyst; (b) contacting the catalyst, without intervening treatment, with a substantially sulfur-free and water-free hydrogen stream at conditions sufficient to reduce the sulfur content of said catalyst to less than about 0.02 wt. percent; (c) thereafter, treating the resultant substantially sulfur-free catalyst with oxygen at conditions sufficient to effect removal of a substantial portion of said carbonaceous materials; (d) purging free oxygen from contact with the treated catalyst; (e) contacting the treated catalyst with a substantially sulfur-free and water-free hydrogen stream at reduction conditions sufficient to reduce the platinum group component of the catalyst; and, (f) contacting the resulting reduced and treated catalyst with an oxygen-free sulfiding gas consisting essentially of hydrogen and hydrogen sulfide at sulfiding conditions sufficient to incorporate sulfur in said catalyst in an amount of about 0.05 wt. percent to about 0.50 wt. percent.

Specific aspects of the present invention relate to details about the catalysts that can be subjected thereto, conditions that are preferably utilized in each of the steps thereof, mechanics of each of the steps thereof, etc., as will be hereinafter discussed.

The present invention encompasses a regeneration procedure for a catalyst containing a platinum group component. Although the regeneration procedure of the present invention is specifically directed to the use of a composite containing platinum, it is intended to include other platinum metals such as palladium, rhodium, ruthenium, osmium and iridium. Generally, the amount of the metallic component composited with the catalyst is small compared to the quantities of the other components combined therewith. For example, platinum and/or palladium, or other metals from the platinum-group will generally comprise from about 0.01% to about 3.0% by weight of the total catalyst calculated on an elemental basis, and usually from about 0.1% to about 2.0% by weight.

Whatever the metallic component, it is generally composited with a highly refractory inorganic oxide such as alumina, silica, zirconia, magnesia, boria, thoria, titania, strontia, etc., and mixtures of two or more including silica-alumina, alumina-boria, silica-alumina-zirconia, etc. It is understood that these refractory inorganic oxides may be manufactured by any suitable method including separate, successive, or coprecipitation methods of manufacture, or they may be naturally-occurring substances such as clays, or earths which may or may not be purified or activated with special treatment. The preferred refractory inorganic oxide comprises alumina, either in admixture with any of the aforementioned refractory oxides, or as the sole component of the refractory carrier material. In the present specification and appended claims, the term "alumina" is employed to mean porous aluminum oxide in all states of oxidation and in all states of hydration, as well as aluminum hydroxide. The alumina may be synthetically prepared or naturally occurring, and it may be of the crystalline or gel type. Whatever type of alumina is employed, it may be activated prior to use by one or more treatments including drying, calcining, steaming, etc. It may be in a form known as activated alumina, activated alumina of commerce, porous alumina, alumina gel, etc.

A catalyst to which the regeneration procedure of the present invention is particularly applicable also contains combined halogen. This combined halogen may be either fluorine, chlorine, iodine, bromine, or mixtures thereof. Of these, fluorine and chlorine are preferred. The halogen may be added to the calcined carrier material in any suitable manner, and either before or after the addition of the catalytically active metallic component. The halogen may be added as an aqueous solution of an acid, such as hydrogen fluoride, hydrogen chloride, hydrogen bromide, etc. Another satisfactory source of halogen is the volatile salts, such as ammonium fluoride, ammonium chloride, etc. At least a portion of the halogen may be composited with the alumina during the impregnation of the latter with platinum group component; for example, through the utilization of a solution of hydrogen chloride and chloroplatinic acid. In any event, the halogen is composited in such a manner as to result in a final composite that contains about .1% to about 1.5% and preferably about 0.4% to about 1.0% by weight of halogen calculated on an elemental basis.

The platinum group component may be incorporated in the catalytic composite in any suitable manner; for example, by impregnation or by coprecipitation with an appropriate platinum group compound, such as chloroplatinic acid, platinum hydroxide, palladium chloride, etc. Platinum is the preferred component.

As indicated previously, all catalysts subjected to the regeneration method of the present invention contain sulfur. Typically, the catalyst acquires the sulfur during the course of a hydrocarbon conversion process wherein a hydrocarbon charge stock, a sulfur additive, and hydrogen are contacted with a catalyst at hydrocarbon conversion conditions. In a case of particular interest, this sulfur accumulates on the catalyst during a reforming operation in which a hydrocarbon charge stock—which generally is a gasoline distillate or fraction thereof—a sulfur additive and hydrogen is charged to a reforming zone containing a catalyst of the type hereinbefore described. This process, because of its exceptional stability, is operated at low pressure in the range of about 50 p.s.i.g. to about 350 p.s.i.g., at a temperature in the range of about 800° F. to about 1100° F., at a space velocity of about 0.5 to about 15.0 hr.$^{-1}$, and at a hydrogen to hydrocarbon mole ratio of about 0.5 to about 20 moles of hydrogen per mole of hydrocarbon. And the sulfur is added as such or in the form of any sulfur-containing compound that yields hydrogen sulfide at the reforming conditions. Furthermore, a portion of this sulfur is preferably incorporated in the catalyst via a preprocessing sulfiding procedure such as is given in the teachings of U.S. Patent No. 3,296,119. In any case the sulfur may be present in chemical combination with other elements of the composite (e.g. platinum sulfide) or it may be adsorbed or chemisorbed on the surface of the composite. Most likely both of these sulfur acquisition modes will be activated during a typical hydrocarbon conversion process. The sulfur will generally be present in an amount of from about 0.05% to about 2.0% by weight or more.

An additional element in the makeup of the catalyst which is subjected to the regeneration process of the present invention will be the deactivating coke or carbonaceous deposits which have accumulated on the catalyst through condensation and polymerization side-reactions during the course of the hydrocarbon conversion process.

An essential feature of the present invention is the removal of sulfur before the removal of any of the carbonaceous deposits. This is accomplished by stopping the introduction of the charge stock into the zone containing the catalyst. Without allowing the deactivated catalyst to come into contact with oxygen a stream of sulfur-free and water-free hydrogen is then introduced into the zone containing the catalyst at a temperature in the range of about 800° F. to about 1100° F., at a pressure in the range of 50 p.s.i.g. to about 350 p.s.i.g. or higher, and at a flow rate sufficient to sustain a steady flow of the hydrogen through the zone; typically, best results are obtained at the hydrogen flow rate used during the conversion process. This contact of the hydrogen stream with the catalyst is continued for a period of time sufficient to reduce the sulfur content of the catalyst to an amount less than about 0.02 wt. percent.

Within the confines of a reforming process employing a hydrogen recycle stream, the above sulfur-removing step is preferably performed on the catalyst without removing it from the reactor. This hydrogen treatment is conveniently performed by stopping the flow of the charge stock to the reactor and passing the recycle hydrogen stream over one or more scrubbers—composed of high surface area sodium, molecular sieves, alumina, silica gel, etc.—designed to eliminate sulfur and water from the hydrogen stream. The resultant substantially sulfur-free and water-free hydrogen can then be utilized as the sulfur desorption agent. In this fashion a continuously recycled hydrogen stream can be utilized to effect the sulfur removal.

Following the sulfur-removal step, the resultant substantially sulfur-free catalyst is then subject to any of the conventional coke-burning procedures of the prior art. This preferably consists in first purging hydrogen from the catalytic environment either by displacement with an inert gas or by depressurizing the environment containing the catalyst down to a fraction of an atmosphere, or by any similar procedure. The carbonaceous deposits are then removed by contacting the catalyst with controlled amounts of oxygen typically obtained by mixing together air and an inert gas in such a manner that the temperature of the catalyst does not exceed about 1100° F. This last requirement is necessary in order to avoid detrimental migrations or transformations of the platinum metal. The concentration of oxygen in the treatment gas is usually adjusted to achieve a combustion temperature in the range of about 700° F. to about 1100° F. and to achieve substantially complete carbon removal. This procedure can be performed at any desired pressure, but atmospheric is generally preferred. The time of contact is generally from about 1 to about 12 hours or more depending on the extent of the carbonization of the catalyst.

After the oxidation step, it is necessary to subject the catalyst to a reduction step in order to reduce any portion of the platinum group component of the catalyst that may have been oxidized. Ordinarily, the environment containing the catalyst must first be purged of all free oxygen by the methods previously outlined in connection with removal of hydrogen from the zone containing the catalyst. This reduction step is then effected by contacting the oxygen-treated catalyst with a stream of hydrogen that is water-free and sulfur-free. This hydrogen can be once-through pure hydrogen or it can be recycle hydrogen that has been suitably scrubbed down to low level of water by passing the gaseous effluent from the zone containing the catalyst over high surface area sodium, aluminosilicates, alumina, silica gel, ion-exchange resins, etc. The temperature employed in this step is within the range of about 900° F. to about 1100° F. and preferably about 950° F. to about 1050° F. This reduction can be conducted at any suitable pressure, but it is generally more convenient to perform it at atmospheric pressure. The time of contact of the hydrogen with the catalyst composite varies as a function of the concentration of oxygen combined with the platinum group component; but in general it is at least one hour.

Following the reduction step, the resultant reduced catalyst is preferably subjected to a sulfiding step in order to restore the previously described beneficial effects of sulfur. This is effected by contacting the reduced composite with an oxygen-free gas mixture essentially consisting of hydrogen and hydrogen sulfide. It is possible to employ other gases than hydrogen as the diluent for the hydrogen sulfide, such as nitrogen or other inert gases; but I find that best results are obtained when oxygen-free hydrogen is used. In addition, it is conceivable that a reducible sulfur-containing compound, such as: mercaptans, sulfides, disulfides, heterocyclic sulfur compounds, etc., could be utilized to furnish the necessary hydrogen sulfide; but for reasons of convenience it is generally preferred to directly utilize hydrogen sulfide. In any event, the concentration of hydrogen sulfide in the diluent must be carefully controlled to insure the deposition of the requisite amount of sulfur and the uniform distribution of the sulfur throughout the catalyst bed. This concentration, accordingly, must be in the range of about 0.1 to about 2 moles of hydrogen sulfide per 100 moles of hydrogen.

The sulfiding operation can be conducted at any suitable temperature but, in general, it is preferred to conduct it at substantially the same temperature that the reduction operation is performed at—namely, about 900° F. to about 1100° F. Likewise, any suitable pressure can be employed in the execution of this step; but, generally, atmospheric pressure is preferred. Additionally, the time of contact of the sulfiding gas coupled with the temperature and pressure are adjusted in order to composite from about 0.05% to about 0.50% by weight of sulfur with the reduced catalytic composite. Moreover, it is generally preferred, at low sulfiding temperatures, to select the exact amount of sulfur to be composited as a function of the platinum metal content in order that the mole ratio of sulfur to platinum is about one.

After the sulfiding step, the catalyst is returned to service in the hydrocarbon conversion process of interest, and it is found to have recovered substantially all of its initial activity and not to have undergone any permanent structural deactivation.

The following example is given to illustrate further the regeneration method of the present invention and to indicate the benefits to be afforded through the utilization

EXAMPLE

A desulfurized heavy Kuwait straight run naphtha having an initial boiling point of 175° F., an end boiling point of 343° F., a sulfur content of less than 1 p.p.m., a nitrogen content of less than 5 p.p.m., and a water content of 1 p.p.m., is charged to a reforming zone containing a catalyst comprising alumina, 0.75% by weight of platinum, 0.90% by weight of chloride, and 0.1% by weight of combined sulfur. The catalyst is manufactured according to the teachings of U.S. Patent No. 3,296,119.

The reforming zone is operated at a pressure of 150 p.s.i.g., at a liquid hourly space velocity of 1.5 hr.$^{-1}$, at a ratio of moles of hydrogen to moles of hydrocarbon of 7.5 and the initial reactor temperature is 970° F.

The flow scheme is, essentially: passing the charge stock with a hydrogen-rich gas into contact with the reforming catalyst, withdrawing an effluent stream, cooling it, and passing it into a separating zone. In the separating zone a hydrogen-rich gas separates from a liquid product, and at least a portion of this gas phase is recycled by compressive means to the reforming zone in order to supply necessary hydrogen thereto. The liquid phase from the separating zone is withdrawn and passed to a debutanizing zone in which a light end $C_1$ to $C_4$ product is taken over head and a $C_5^+$ product is recovered as a high octane product. Before the plant is started-up it is dried to 10 p.p.m. by volume of water in the recycle gas, by circulating hydrogen through the plant and a molecular sieve drier at 400 p.s.i.g.

Tertiary butyl mercaptans added to the feed to maintain the total hydrogen sulfide entering the reforming zone, from both the charge stock and the recycle hydrogen gas, at 1500 p.p.m. of sulfur based on weight of charge stock.

The reactor temperature is adjusted throughout the run in order to maintain the output debutanized product stream at an octane number of 100 F–1 clear.

The process is run for an extended period of time and deactivates at a very slow rate. At the time when the catalyst has processed about 50 barrels of charge stock per pound of catalyst, the octane temperature response of the catalyst coupled with declining $C_5^+$ yield indicates that it is necessary to regenerate the catalyst. At this point the introduction of the charge stock is stopped and a high surface area scrubber is utilized to purify the hydrogen recycle stream in order that essentially sulfur-free hydrogen is recycled to the reforming zone. This recycling of sulfur-free hydrogen continues at a temperature of about 1000° F. until the sulfur level in the hydrogen gas going to the scrubber has fallen to less than about 5 volume p.p.m. hydrogen sulfide. The hydrogen treatment of the catalyst then stops and an analysis of a sample of the catalyst shows that it contains less than about 0.01% by weight of sulfur.

The reforming zone is then purged with nitrogen and a controlled amount of sulfur-free air is introduced into the circulating nitrogen in such an amount that the catalyst during the coke burning period remains at a temperature of 950° F. This treatment is continued for about 8 hours.

The free oxygen is then purged from the system with nitrogen and the nitrogen is then removed by displacement with hydrogen. The hydrogen stream is passed through a high surface area sodium scrubber and the resultant sulfur-free and water-free hydrogen is circulated through the bed of catalyst at a temperature of about 1000° F. until the platinum is substantially reduced.

The reduced catalytic composite is thereafter contacted with a mixture of hydrogen and hydrogen sulfide in which hydrogen sulfide is present in a mol ratio of about 1 mole per 100 moles of hydrogen. This step is performed at a temperature of 950° F., at atmospheric pressure, and for a period of time effecting the incorporation of about 0.1% by weight sulfur in the catalytic composite.

The resultant composite is then returned to reforming service and found to have substantially the same activity, selectivity, and stability as the original fresh charge of catalyst.

I claim as my invention:

1. In a hydrocarbon conversion process wherein a hydrocarbon charge stock, a sulfur additive and hydrogen are simultaneously contacted with a catalyst containing a platinum group component and a sulfur component at hydrocarbon conversion conditions and wherein carbonaceous materials are deposited on the catalyst resulting in deactivation thereof, the method of regenerating the deactivated catalyst which comprises the steps of:
   (a) stopping the contacting of the hydrocarbon charge stock with the catalyst;
   (b) contacting the catalyst, without intervening treatment, with a substantially sulfur-free and water-free hydrogen stream at conditions sufficient to reduce the sulfur content of said catalyst to less than about 0.02 wt. percent;
   (c) thereafter, treating the resultant substantially sulfur-free catalyst with oxygen at conditions sufficient to effect removal of a substantial portion of said carbonaceous materials;
   (d) purging free oxygen from contact with the treated catalyst;
   (e) contacting the treated catalyst with a substantially sulfur-free and water-free hydrogen stream at reduction conditions sufficient to reduce the platinum group component of the catalyst; and
   (f) contacting the resulting reduced and treated catalyst with an oxygen-free sulfiding gas consisting essentially of hydrogen and hydrogen sulfide at sulfiding conditions sufficient to incorporate sulfur in said catalyst in an amount of about 0.05 wt. percent to about 0.50 wt. percent.

2. The method of claim 1 wherein said platinum group component is platinum.

3. The method of claim 1 wherein said platinum group component constitutes about 0.01 wt. percent to about 3.0 wt. percent of said catalyst.

4. The method of claim 1 wherein said sulfur component constitutes about 0.05 wt. percent to about 2.0 wt. percent of said catalyst.

5. The method of claim 1 wherein said catalyst is a composite of alumina, platinum, halogen and sulfur.

6. The method of claim 1 wherein said hydrocarbon conversion process is reforming and said hydrocarbon charge stock boils in the gasoline range.

References Cited

UNITED STATES PATENTS

| | | | |
|---|---|---|---|
| 2,863,825 | 12/1958 | Engel | 208—138 |
| 3,006,841 | 10/1961 | Haensel | 208—139 |
| 3,067,130 | 12/1962 | Baldwin et al. | 208—140 |
| 3,201,343 | 8/1965 | Bicek | 208—138 |
| 3,296,119 | 1/1967 | Bicek | 208—139 |

FOREIGN PATENTS

| | | |
|---|---|---|
| 586,666 | 11/1959 | Canada. |

HERBERT LEVINE, Primary Examiner

U.S. Cl. X.R.

252—416